United States Patent
Wend et al.

(10) Patent No.: US 8,561,787 B2
(45) Date of Patent: Oct. 22, 2013

(54) CONVEYOR INSTALLATION FOR HANGING ITEMS

(75) Inventors: Michael Wend, Bielefeld (DE); Paul Janzen, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 89 days.

(21) Appl. No.: 13/040,883

(22) Filed: Mar. 4, 2011

(65) Prior Publication Data

US 2011/0214967 A1    Sep. 8, 2011

(30) Foreign Application Priority Data

Mar. 4, 2010    (DE) .................. 10 2010 010 107

(51) Int. Cl.
*B65G 17/20*    (2006.01)
*B65G 19/02*    (2006.01)
*B65G 47/29*    (2006.01)

(52) U.S. Cl.
USPC ........ 198/687; 198/678.1; 198/680; 198/682; 198/343.1; 104/89; 104/93; 104/94; 104/95; 104/172.1; 104/172.2; 104/172.4; 104/172.5

(58) Field of Classification Search
USPC .................. 198/343.1, 678.1, 680, 682, 687; 104/89, 93, 94, 95, 172.1, 172.2, 104/172.4, 172.5
See application file for complete search history.

(56) References Cited

U.S. PATENT DOCUMENTS

| | | | | |
|---|---|---|---|---|
| 2,309,587 A * | 1/1943 | Hassler | ...... | 104/172.5 |
| 3,230,897 A * | 1/1966 | Barclay | ...... | 104/172.4 |
| 3,598,228 A * | 8/1971 | Pipes | ...... | 198/687 |
| 4,147,110 A * | 4/1979 | Knudsen | ...... | 104/172.4 |
| 4,483,252 A * | 11/1984 | Pierson | ...... | 104/172.3 |
| 5,002,421 A * | 3/1991 | Vrieze | ...... | 403/292 |
| 5,056,438 A * | 10/1991 | Nozaki et al. | ...... | 104/88.06 |
| 5,437,231 A * | 8/1995 | Janzen et al. | ...... | 104/172.4 |
| 5,819,906 A * | 10/1998 | Enderlein et al. | ...... | 198/687.1 |
| 6,554,127 B1 * | 4/2003 | Kroll | ...... | 198/465.4 |
| 6,745,891 B2 * | 6/2004 | Walter et al. | ...... | 198/465.4 |
| 6,945,027 B2 * | 9/2005 | Blase | ...... | 59/78.1 |

FOREIGN PATENT DOCUMENTS

| | | |
|---|---|---|
| DE | 3812023 A1 * | 10/1989 |
| DE | 4017821 C2 | 12/1990 |
| DE | 29621786 U1 | 3/1997 |
| DE | 29709547 U1 | 8/1997 |
| DE | 29915523 U1 | 2/2000 |
| DE | 10031033 A1 | 1/2002 |
| DE | 10333938 B3 | 11/2004 |
| DE | 102005006455 A1 | 8/2006 |
| EP | 0623497 B1 | 11/1994 |

\* cited by examiner

*Primary Examiner* — Leslie A Nicholson, III
*Assistant Examiner* — Matthew Marotta
(74) *Attorney, Agent, or Firm* — Browdy and Neimark, PLLC

(57) ABSTRACT

A conveyor installation for conveying and accumulating hanging items comprises a drive chain which is mounted to a guide rail, and retaining members which are mounted on rollers below the drive chain. The retaining members—together with the items to be transported which are suspended therefrom—are conveyed by the drive chain in a direction of conveyance and, if required, stopped and accumulated by means of a stopping device, with the drive connection being released between the drive chain and the retaining members by displacing the drive chain upwards due to a particular design of coupling members arranged on the lower side of the drive chain.

3 Claims, 2 Drawing Sheets

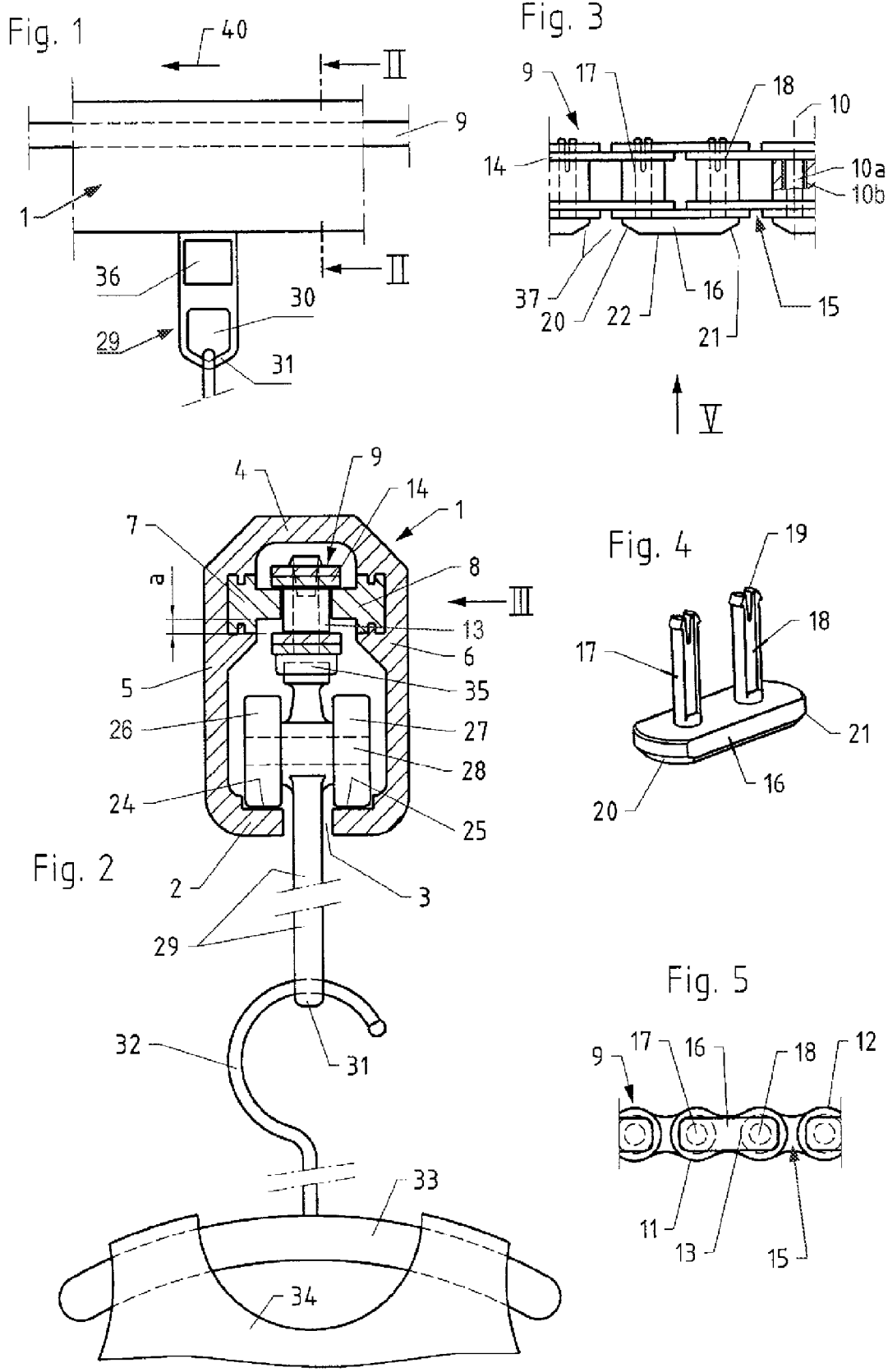

CONVEYOR INSTALLATION FOR HANGING ITEMS

BACKGROUND OF THE INVENTION

1. Field of the Invention

The invention relates to a conveyor installation for hanging items, in particular for pieces of clothing hanging on hangers, comprising a transport rail with a bearing; a drive chain which is guided in said bearing and is drivable in a direction of conveyance and which comprises upper coupling members located at a lower side of said drive chain; retaining members for said hanging items, which retaining members are displaceably mounted in the direction of conveyance below the drive chain by means of rollers, with the upper ends of the retaining members being provided with lower coupling members, and with in each case one upper coupling member and one lower coupling member forming a drive connection of the drive chain with a retaining member for conveyance of said retaining member in the direction of conveyance.

2. Background Art

A conveyor installation of this type is known from DE 10 2005 006 455 A1 where a strand of a circulating drive chain, which is drivable in a transport direction, is arranged in a transport rail. The drive chain is embodied with downwardly protruding bolts. Below the drive chain, retaining means are provided which are mounted on rollers in the transport rail, the lower end of which being provided with an opening for receiving the hook of a hanger with a piece of clothing. Each of the retaining means is provided with lugs at their upper ends which project upwards between adjacent bolts so as to form a positive drive connection between the drive chain and the retaining means. The conveyor installation, which is referred to as transport system, comprises no device which allows retaining means to accumulate while the drive chain is being driven continuously.

EP 0 623497 B1 discloses an accumulatable conveyor where a carrier for items to be transported is mounted on a carrier rail via rotatably drivable rollers, the carrier being drivable in a direction of conveyance by a traction means in the form of a friction belt which is also mounted to the transport rail. In order for carriers to accumulate in a desired manner, a stopping device comprising a retaining finger is provided, which retaining finger is extendable into the movement area of the carriers and acts on a spreader device mounted to the carrier, thus causing the carrier to be pivoted laterally and therefore to be lifted off the friction belt.

The disadvantage of this arrangement is that lifting succeeding carriers off the friction belt requires the spreading devices, which are assigned to the individual carriers, to come into direct contact with each other. Lifting the carriers off the friction belt, in other words bringing about a state in which the carrier is not driven, is however impossible if the transported items have a dimension in the direction of conveyance, in other words a thickness, which is greater than the distance of carriers which are in close contact with each other. This results in a frictional drive connection between stopped carriers and the continuously running friction belt, which in turn results in excessive wear and undesirable downtimes required to perform repair works at the conveyor installation. Another disadvantage is that lifting the carrier off the friction belt is performed by pivoting the carrier, which causes the elastically deformable spreading devices of plastic material to be subjected to inertial forces depending on the mass of the trans-ported items, thus resulting in premature wear.

DE 296 21 786 U1 discloses a pawl conveyor where a traction means, which is drivable in a direction of conveyance, is provided with pivotable pawls having a hook-shaped end allowing the pawls to displaceably seize and convey hangers loaded with items to be transported along a rail. The particular shape of the pawls allows hangers to accumulate by means of a device which lifts a pawl by means of a stopping member which comes into contact with the lower side of the pawl and thus disengages the hook-shaped end from the hanger and causes succeeding pawls to be lifted by the hanger which has just been brought to a standstill. One disadvantage of this conveyor is that a continuous accumulation of hangers is only possible if particular design specifications have been determined for the dimensions of the pawls and accordingly, the thickness of the transported items. Another particular disadvantage is that the hook-shaped ends of the pawls may be subjected to an excessive load during an accumulation process if pivoting a pawl is impossible due to a previously transported item having an excessive thickness. The last-mentioned disadvantage is to be remedied by a pawl designed according to DE 299 15 523 U1.

DE 40 17 821 C2 discloses a conveyor installation where carriages for items to be transported are moved along guide rails by means of bristles which are arranged, in the form of drivers, on a driven belt strand and come into frictional contact with a portion of the carriages. If it is desired to accumulate transported items, the carriages are stopped while the bristles keep on moving so that a residual frictional force is exerted on the carriages. In this conveyor installation, the bristles are to act as a slip coupling which forms a releasable drive connection independently of other criteria and allows continuous accumulation of transported items independently of their thickness. In this type of drive connection where the drivers come into engagement with the bristles and are moved relative to each other during an accumulation process, the bristles are subjected to a considerable amount of wear. This results in downtimes required to replace worn-out bristles by new ones.

An overhead conveyor installation is disclosed in DE 297 09 547 U1 where hanger carriers, which are mounted on rollers and are driven by a conveyor chain located thereabove, are movable along a main conveyance path. To this end, the conveyor chain is provided with drivers which are mounted thereto at regular distances and cooperate with rigid coupling members at the hanger carriers. A switch station allows the hanger carriers to be moved to the side, i.e. from the main conveyance path to an accumulation path, which causes the drive connection to be released. The diverted hanger carriers are then driven by a separate drive device. In the region of an accumulation path, a stopping device referred to as accumulation stop is provided where hanger carriers accumulate. As it is required to install a separate, complex drive device for driving the hanger carriers to be accumulated along the accumulation path, the design of the overhead conveyor installation is extremely complicated.

SUMMARY OF THE INVENTION

It is the object of the invention to develop the system of the generic type in such a way as to achieve a reliable and substantially wear-free functioning of the system for conveying and continuously accumulating items independently of their properties.

This object is achieved in the conveyor installation for hanging items, in particular for pieces of clothing hanging on hangers, comprising a transport rail with a bearing; a drive chain which is guided in said bearing and is drivable in a direction of conveyance and which comprises upper coupling members located at a lower side of said drive chain; retaining members for said hanging items, which retaining members are displaceably mounted in the direction of conveyance below the drive chain by means of rollers, with the upper ends of the retaining members being provided with lower coupling members, and with in each case one upper coupling member and one lower coupling member forming a drive connection of the drive chain with a retaining member for conveyance of said retaining member in the direction of conveyance, wherein the bearing is designed such that the drive chain is displaceable upwards by a distance a in a direction opposite to gravity; the coupling members are designed such that the transmission of a drive force of the drive chain takes place via a normal force component and a lifting force component which is opposite to gravity, with a line of action of the normal force component forming an angle W with a line of action of the drive force of the drive chain, wherein the line of action is parallel to the direction of conveyance; and an actuable stopping device is provided for accumulating retaining members, with the lifting force component causing the upper coupling member to be lifted upwards by a displacement path v for releasing the drive connection, with v<a.

By means of the invention, a substantially wear-free positive or non-positive drive connection between the retaining members, which carry items to be transported, and the drive chain is achieved with a lowest-possible number of simple components. A particular advantage is that the drive chain is a standardized mass production component which is available on the market at low prices but forms an essential feature of the invention by the arrangement of a single component. Furthermore, the subject matter of the invention is distinguished by the fact that forces occurring during an accumulation process are independent of the mass of the trans-ported item and that a continuous accumulation of transported items is possible independently of the dimensions of the transported items.

A conveyor installation wherein the transport rail is substantially horizontal in a region of the stopping device; a conveyor installation wherein seen in the direction of conveyance, the upper coupling member comprises a front boundary surface which runs obliquely to the direction of conveyance and forms an angle W1 with the line of action of the driving force of the drive chain, with 0°<W<90°; and a conveyor installation wherein 90°>W>0° applies to the angle W result in advantageous force relations. The developments of the conveyor installation wherein the drive chain comprises joints which are pivotable about vertical axes and of the conveyor installation wherein the joints comprise bores which extend along the axes, with pins of the upper coupling members being received therein, result in a particularly simple and cost-saving design. A conveyor installation wherein the pins are provided with a snap fit is a simple, advantageous embodiment which allows easy mounting and, if necessary, easy replacement of a wornout coupling member by a new one. A conveyor installation wherein the upper coupling members are formed of plastics results in a cost-saving production of the upper coupling members.

Further features, advantages and details of the invention will become apparent from the ensuing description of an embodiment by means of the drawing.

BRIEF DESCRIPTION OF THE DRAWING

FIG. 1 is a partial front view of a conveyor installation;
FIG. 2 is an enlarged sectional view of the conveyor installation along section line II-II in FIG. 1;
FIG. 3 is a side view of a drive chain with upper coupling members according to arrow III-III in FIG. 2;
FIG. 4 is a perspective view of the upper coupling member shown in FIG. 3;
FIG. 5 is a view of the drive chain according to arrow V in FIG. 3.

DESCRIPTION OF THE PREFERRED EMBODIMENT

Figure 6:
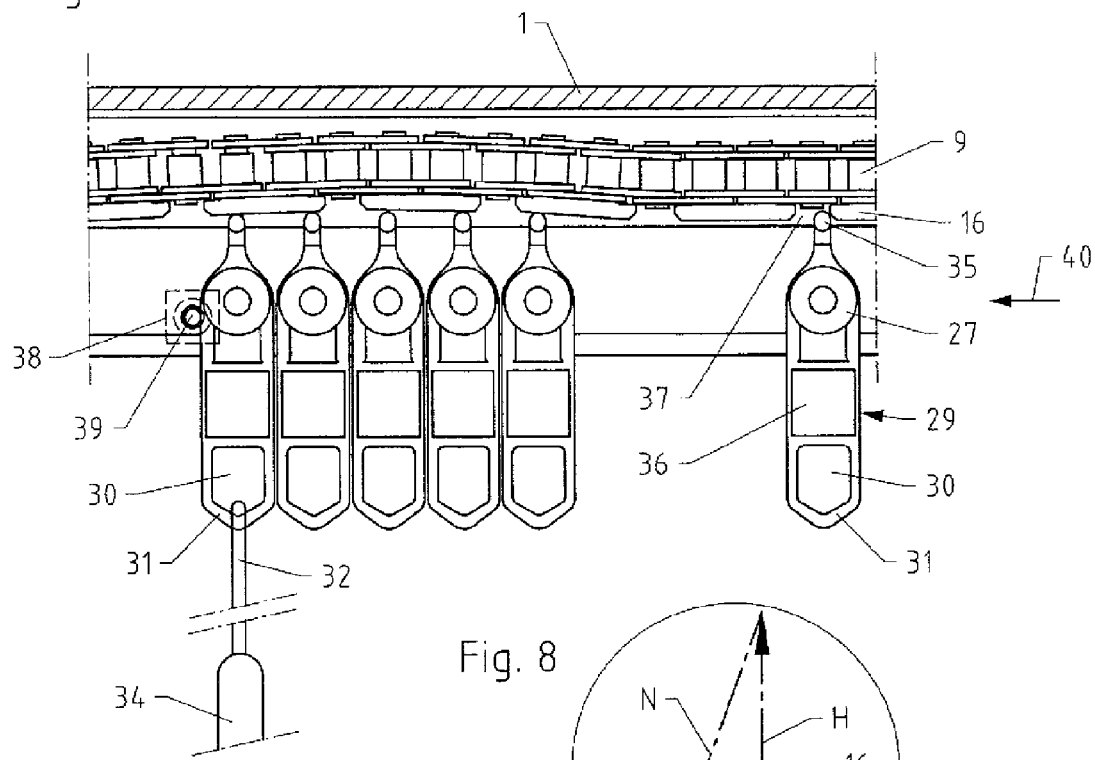
FIG. 6 is a an enlarged side view of the conveyor installation according to arrow III-III in FIG. 2, with the front wall of a transport rail being broken away.

A transport rail 1 is substantially horizontally mounted to a wall or a ceiling. The transport rail 1 is continuously cast from aluminium and has a box-shaped and symmetrical cross-section with a slot 3 at the lower side 2.

The transport rail 1 has side walls 5, 6 which extend downwards from an upper wall 4 and comprise recesses with projections arranged therein on their inner sides which face each other. Profiles made of plastics and serving as bearings 7, 8 are in each case positively retained and firmly embedded in the recesses.

The facing rectangular ends of the bearings 7, 8 accommodate a strand of an endless drive chain 9 with a certain amount of clearance. The drive chain 9 is drivable for circulation by means of an electric motor which is not shown in FIG. 1. Being a conventional roller chain, the drive chain 9 comprises joints 11 which are pivotable about vertical axes 10, with sheet metal lugs 12 being interconnected by hollow rivets 10b which are provided with bores 10a. The joints 11 of the drive chain 9 are designed to have a normal amount of clearance, which allows the drive chain 9 to describe a slight curve as shown by the partially curved drive chain 9 in FIG. 6.

The drive chain 9 is arranged in the transport rail 1 in such a way that it is on the one hand guided horizontally by means of the rollers 13 which are rotatably mounted on the rivets 10b. On the other hand, a vertical guidance is achieved in such a way that the lower sides of lugs 14 of the drive chain 9 rest on the bearings 7, 8 due to the own weight of the drive chain 9. Furthermore, the bearings 7, 8 are dimensioned in such a way in the vertical direction that the drive chain 9 is mounted for displacement in a direction opposite to the direction of gravity along a distance a.

On the lower side 15 of the drive chain 9, each chain link is provided with an upper coupling member 16 which is preferably made of plastics. The coupling member 16 is designed to have two pins 17, 18 which are received in the bores 10a of the hollow rivets 10b. According to FIG. 4, the flattened, slotted and spreaded ends form in each case a snap fit 19 by means of which the coupling members 16 are firmly secured to the drive chain 9. The snap fits 19 allows the coupling members 16 to be easily mounted to the drive chain 9 without requiring any tooling.

Figure 8:
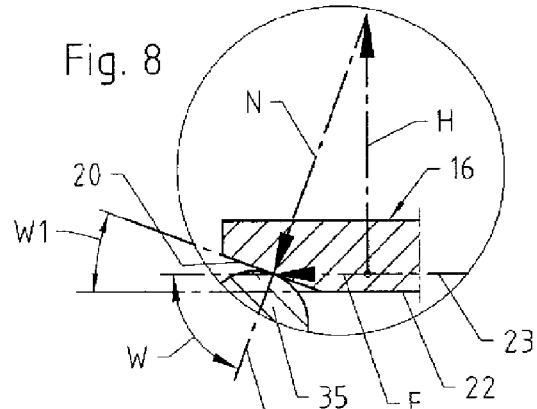
FIG. 8 is an enlarged detail Z of FIG. 7.

Relative to a direction of conveyance 40, the upper coupling member 16 comprises a front boundary surface 20, a rear boundary surface 21 and a lower side 22. A line of action 23 of a drive force F of the drive chain 9 is parallel to the lower side 22 and to the direction of conveyance 40 (FIG. 8).

The front boundary surface 20 is designed in such a way that a normal n, in other words the vertical line of action of the normal force component N, to the boundary surface 20 forms an angle W with the line of action 23 of the drive force F, the angle amounting to W>0 degrees and W<90 degrees. As a result, it follows that the boundary surface 20 forms an angle W1>0 and W1<90 degrees with the lower side 22. In the exemplary embodiment, the angles amount to W=70 degrees and W1=20 degrees.

The rear boundary surface 21 is mirror symmetric to the boundary surface 20. It is however conceivable as well to design the rear boundary surface 21 in such a way as to have different angles than the front boundary surface 20.

According to FIG. 2, the transport rail 1 has bearing surfaces 24, 25 on its lower side 2 on which rollers 26, 27 are supported. These rollers 26, 27 are rotatably mounted to an axle 28 which is an integral component of a retaining member 29 made of plastics. The retaining member 29 comprises an opening 30 with an angled web 31 that forms the lower end of the opening 30 into which a hook 32 of a hanger 33 carrying an item 34 to be trans-ported is inserted. The retaining member 29 firmly encloses the axle 28 and extends up to an upper end which is in the shape of a T-shaped projection and forms a lower coupling member 35. The retaining member 29 is furthermore provided with a memory chip 36 for identifying the hanger 33 inserted therein. According to FIG. 2, the lower coupling member 35 of the retaining member 29 projects into a gap 37 which is located between two adjacent upper coupling members 16 and is formed between the rear boundary surface 21 of a leading—relative to the direction of conveyance 40—upper coupling member 16 and the directly trailing front boundary surface of a directly trailing upper coupling member 16.

Furthermore, the transport rail 1 is provided with a stopping device 38 (FIG. 6) comprising an axially displaceable, bolt-shaped stopping member 39 which is pneumatically or electrically displaceable into a rest position which provides access to the movement area of the retaining members 29 or a working position where no access is provided to the movement area of the retaining members 29.

The functioning is as follows:

When the conveyor installation is in operation, the retaining members 29 are conveyed, whether unloaded or loaded with items, in the direction of conveyance 40 in such a way that the lower coupling members 35 of the retaining members 29 project into the gaps 37 located between adjacent upper coupling members 16 so that the two coupling members 16, 35 come into contact with each other so as to form a drive connection in the direction of conveyance 40. This operating state is for example outlined in FIG. 7 and shown as an enlarged detail in FIG. 8. The lower coupling member 35 of a retaining member 29 abuts against the front boundary surface of an upper coupling member 16.

FIG. 8 shows that if frictional forces at the point of contact of the coupling members 16, 35 are neglected, a drive force F exerted by the drive chain 9 may be regarded as the resultant of a normal force component N and a lifting force component H; in the process of conveying items, the lifting force component H is smaller than the force which is required to lift the upper coupling member 16, together with the proportionate own weight of the drive chain 9, upwards from its lower position by the length of a displacement path v. The displacement path v makes up only a portion of the distance a, it is therefore smaller than the distance a.

Figure 7:
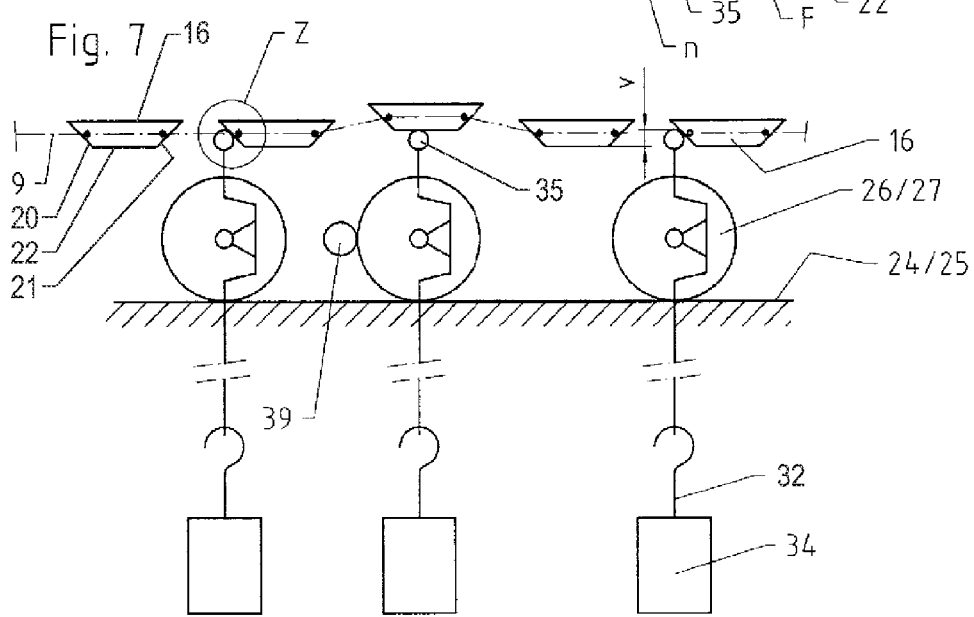
FIG. 7 is a schematic view of the conveyor installation according to the view of FIG. 6.

Having initiated a desired accumulation process, in other words an accumulation of retaining members 29 independently of their loading state by activating the stopping device 38 so as to form an accumulation path, the stopping member 39, which is axially displaced into the path of the retaining members 29, brings the next arriving retaining member 29 to a stop. When the drive chain 9 keeps on moving, the previously observed force relations are changed in such a way that the lifting force component H increases to such an extent that the upper coupling member 16 is displaced upwards by the displacement path v together with the proportionate own weight of the drive chain 9 (FIG. 7). As can be seen in FIGS. 6 and 7, the drive chain 9 is then slightly lifted up by the displacement path v, which causes the drive chain 9 to be curved. After lifting, the upper coupling member 16 slides across the lower coupling member 35, with the lower side 22 of the upper coupling member 16 being in contact with the lower coupling member 35. Furthermore, it shall be noted that during conveyance, static friction is active between the two coupling members 16, 35 while the lower dynamic friction is active during the accumulation process.

This state is outlined in FIG. 7. When the drive chain 9 keeps on moving, resulting in the development of the accumulation path, this process of releasing the drive connection and re-engagement of coupling members 16 and 35 passing each other is repeated.

What is claimed is:

1. A conveyor installation for hanging items (34) comprising:
    a transport rail (1) with bearings (7, 8);
    a drive chain (9) which is guided between said bearings (7, 8) and drivable in a direction of conveyance (40) and which comprises upper coupling members (16) located at a lower side (15) of said drive chain (9), the drive chain (9) comprising joints (11) which are pivotable about vertical axes (10), the joints (11) comprising bores (10a) which extend along the axes (10), with pins (17, 18) of the upper coupling members (16) being received therein, the pins (17, 18) being provided with a snap fit (19) to firmly secure the upper coupling members (16) to the drive chain (9), and the upper coupling members (16) being a plastics material;
    retaining members (29) for said hanging items (34),
    rollers (26, 27) connected to displaceably mount said retaining members (29) in the direction of conveyance (40) below the drive chain (9),
    lower coupling members (35) provided on upper ends of the retaining members (29),
    an actuable stopping device (38) disposed to engage and accumulate the retaining members (29), said stopping device (38) comprises an axially displaceable stopping member (39) disposed below the lower coupling members (35) so as not to come into contact with the upper coupling members (16), the stopping member being displaceable between a rest position that provides access to a movement area of the retaining members (29) and a working position which provides no access to the movement area of the retaining members (29), and
    wherein each of the upper coupling members (16) cooperate with only one of the lower coupling members (35) to form a drive connection for the drive chain (9) and said one of the retaining members (29) for conveyance of said retaining members (29) in the direction of conveyance (40); and wherein
    the bearings are (7, 8) configured such that only the drive chain (9) is displaceable vertically upwards by a distance a in a direction opposite to gravity;
    the coupling members (35, 16) are configured such that the transmission of a drive force (F) of the drive chain (9) in the direction of conveyance (40) only takes place via a normal force component (N) and a lifting force component (H) which is opposite to gravity, with a first line of action (n) of the normal force component (N) forming an angle W with a second line of action (23) of the drive force (F) of the drive chain (9), wherein the second line of action (23) is parallel to the direction of conveyance (40); and the lifting force component (H) causing the upper coupling member (16) to be lifted upwards by a displacement path v for releasing the drive connection, with v<a, wherein $80° \geq W \geq 70°$ applies to the angle W, wherein seen in the direction of conveyance (40), the upper coupling member (16) comprises a front boundary surface which runs obliquely to the direction of conveyance (40) and forms an angle W1 with the line of action (23) of the driving force (F) of the drive chain, with $10° \leq W1 \leq 20°$, and wherein $W+W1=90°$ applies to the angles W and W1, and wherein, during conveyance, the lower coupling member 35 rests against said front boundary surface so that transport of the retaining members is performed by static friction and during an accumulation process, lower dynamic friction is active.

2. A conveyor installation according to claim 1, wherein the hanging items (34) are pieces of clothing hanging on hangers (33).

3. A conveyor installation according to claim 1, wherein the transport rail (1) is horizontal in a region of the stopping device (38).

* * * * *